United States Patent
Stefan et al.

(10) Patent No.: US 12,151,984 B2
(45) Date of Patent: Nov. 26, 2024

(54) BUILDING WATERPROOFING KIT-OF-PARTS AND USE THEREOF AS LIQUID BUILDING WATERPROOFING AGENT AND USE THEREOF

(71) Applicant: PS2G GmbH, Frankfurt am Mai (DE)

(72) Inventors: Gaspard Stefan, Frankfurt am Mai (DE); Gabor Peter, Frankfurt am Mai (DE)

(73) Assignee: PS2G GMBH, Frankfurt am Main (DE)

( * ) Notice: Subject to any disclaimer, the term of this patent is extended or adjusted under 35 U.S.C. 154(b) by 1046 days.

(21) Appl. No.: 17/055,452

(22) PCT Filed: Apr. 23, 2019

(86) PCT No.: PCT/EP2019/060328
§ 371 (c)(1),
(2) Date: May 5, 2021

(87) PCT Pub. No.: WO2019/219337
PCT Pub. Date: Nov. 21, 2019

(65) Prior Publication Data
US 2021/0253487 A1    Aug. 19, 2021

(30) Foreign Application Priority Data

May 15, 2018   (EP) .................................... 18172434

(51) Int. Cl.
*C04B 41/49*   (2006.01)
*C04B 41/45*   (2006.01)
*C04B 41/46*   (2006.01)
*C04B 41/50*   (2006.01)
*E04B 1/64*   (2006.01)
*C04B 103/65*   (2006.01)

(52) U.S. Cl.
CPC ...... *C04B 41/4922* (2013.01); *C04B 41/4535* (2013.01); *C04B 41/463* (2013.01); *C04B 41/502* (2013.01); *E04B 1/64* (2013.01); *C04B 2103/65* (2013.01)

(58) Field of Classification Search
None
See application file for complete search history.

(56) References Cited

FOREIGN PATENT DOCUMENTS

| DE | 4031745 C2 | 4/1992 |
| DE | 4127351 C2 | 2/1993 |
| DE | 19955047 A1 | 6/2001 |
| DE | 10130091 A1 | 1/2003 |
| DE | 102010021111 A1 | 11/2011 |
| EP | 270715 A1 | 6/1988 |
| EP | 0577014 A1 | 1/1994 |
| FR | 2605032 A1 | 4/1988 |
| GB | 1123983 A | 8/1968 |
| RU | 2674057 C2 * | 12/2018 ............. C03C 17/30 |

OTHER PUBLICATIONS

Machine translation of Lu, RU 2674057 C2 (Year: 2018).*
International Search Report relating to corresponding application PCT/EP2019/060328 dated Jul. 3, 2019.

* cited by examiner

*Primary Examiner* — Coris Fung
*Assistant Examiner* — Keling Zhang
(74) *Attorney, Agent, or Firm* — Grossman, Tucker, Perreault & Pfleger, PLLC

(57) ABSTRACT

A building waterproofing kit-of-parts comprising A) an aqueous first composition, containing ao) water, a1) a ketone solvent and a2) a carboxylic acid and a3) an alkylalkoxysilane and/or a4) an aminoalkylalkoxysilane, and B) a second composition, containing b1) an alkylalkoxysilane and b2) a hydrocarbon solvent as well as b3) an alcohol solvent and/or b4) an ester solvent and/or b5) a ketone solvent. Use of the kit-of-parts for the waterproofing of buildings and the elimination of moisture damage in buildings. Liquid building waterproofing agent, obtained by blending the compositions A) and B).

20 Claims, No Drawings

BUILDING WATERPROOFING KIT-OF-PARTS AND USE THEREOF AS LIQUID BUILDING WATERPROOFING AGENT AND USE THEREOF

BACKGROUND

Technical Field

The present disclosure relates to a building waterproofing kit-of-parts, in some cases a masonry waterproofing kit-of-parts. The present disclosure also relates to the use of the kit-of-parts according to the present disclosure for the waterproofing of buildings, in some cases masonry, e.g. damp masonry, for the removal of moisture damage in a building, in some cases masonry, for the moisture sealing of buildings, in some cases masonry, and for the formation of a moisture barrier in buildings, in some cases in masonry. The present disclosure further relates to a liquid building waterproofing agent, in some cases masonry waterproofing agent, and its use.

Description of the Related Art

Moisture damage to buildings regularly not only diminishes living quality and undermines hygiene standards, but sometimes also contributes to a significant reduction in property value. If moisture damage to buildings is not rectified, or only rectified at a later stage, permanent damage can occur to the building substance or structural damage may result, such as the washing out of salts from mineral building materials or the entrance of salts into porous building materials. In the latter case, the hygroscopic nature of the masonry continuously increases, leading to increased formation of moisture damage. If, for example, moisture enters a cellar space, the high humidity that results and the subsequent formation of mold can render the cellar unusable. Once moisture has entered masonry, it also enters higher areas due to the capillary effect in porous building materials, and also causes damage where the masonry is not directly exposed to moisture. Damage to the outer seal or the foundation of a building is often responsible for water entry.

Subsequently suppressing moisture damage to buildings or fully rectifying the problem often entails a considerable degree of effort. For example, outer walls may need to be exposed, sections of the masonry might need to be removed, and a reliable and permanent moisture insulation may need to be re-applied, usually after the masonry that has been exposed to moisture has fully dried out. For a person skilled in the art, moisture damage to masonry is a substantial challenge, some cases in cellar areas, when the outer side cannot be exposed. And rectifying moisture damage to heritage-listed buildings generally involves high costs, since changes cannot be made to the building substance.

Numerous methods are known to a person skilled in the art in order to repair moisture damage. In many cases, attempts are made to attach a waterproof seal to the outer surface of the affected masonry. According to DE 40 31 745 C2, a polymer/bitumen emulsion can be used for this purpose. DE 41 27 351 C2 also describes a multi-layer system of an alkaline primer containing silicone, a mineral cement interim layer and a polymer dispersion modified mineral cement coating. If the moisture damage can only be repaired on the inner side, a person skilled in the art generally has the option of impregnating the damp wall via injection and applying a moisture-proof coating on the inner side. With the method of impregnating masonry, an attempt is usually made to install a so-called horizontal barrier, which prevents a further penetration of moisture. Often, silicone microemulsions or silicone resins are used for this purpose, with which, by way of an emulsifying agent, the silicone materials are present distributed in water in the form of small droplets. The use of diluted aqueous water glass solutions is also known, with the aid of which a so-called silicification barrier can be created. Silicification barriers generally lead to cold bridges, which is diametrically opposed to a desired thermal insulation. DE 101 30 091 A1 proposes a special cream-like water-in-oil emulsion for the waterproofing of masonry via injection. Due to the viscous consistency of the impregnation mass, a pressureless filling with almost horizontal bore holes should be possible. According to DE 10 2004 013 726 A1, acrylate gels should also be suitable for the injection into masonry. The impregnation of masonry above liquid containers arranged above bore holes is also proposed in EP 270 715 A1, FR 2 605 032 and GB 1,123,983.

DE 10 2010 021 111 A1 describes the pressing in of a pumpable composition into a porous section of the masonry to provide a waterproof seal of porous sections of a building, wherein said composition must have water-repellent or infiltrating properties.

Then, a coating must be applied on a sealing slurry on the inner side of the segment of the masonry to be treated.

The methods known from the prior art are still disadvantageous in all cases. It would be desirable to be able to have recourse to improved treatment of buildings that have been subjected to moisture damage. Thus, there is accordingly a need to be able to repair buildings showing moisture damage in such a manner that both a moisture-free building is attained and recurring moisture penetration can be permanently and reliably prevented.

BRIEF SUMMARY

Accordingly, a building waterproofing kit-of-parts, in some cases a masonry waterproofing kit-of-parts, has been found, comprising and in some cases consisting of A) a first aqueous composition, consisting of or containing
  a0) water,
  a1) at least one ketone solvent, alcohol solvent or ester solvent, in some cases ketone solvent, and
  a2) at least one carboxylic acid with 1 to 10 carbon atoms, and
  a3) at least one alkylalkoxysilane, and/or, in some cases and,
  a4) at least one aminoalkylalkoxysilane,
  and
B) a second composition, consisting of or containing
  b1) at least one alkylalkoxysilane, and
  b2) at least one hydrocarbon solvent, and/or, in some cases and,
  b3) at least one alcohol solvent, ketone solvent and/or ester solvent, in some cases alcohol solvent, and/or
  b4) at least one ester solvent, alcohol solvent and/or ketone solvent, in some cases ester solvent, and/or
  b5) at least one ketone solvent, alcohol solvent and/or ester solvent, in some cases ketone solvent.

In one advantageous embodiment, the second composition B) of the building waterproofing kit-of-parts according to the present disclosure can, alongside the additional component or components of this second composition, contain the at least one hydrocarbon solvent and/or the at least one alcohol solvent, ketone solvent and/or ester solvent; or the at least one hydrocarbon solvent and the at least one alcohol solvent, ketone solvent and/or ester solvent; or the at least one hydrocarbon solvent, the at least one alcohol solvent, the at least one ketone solvent and the at least one ester solvent; or the at least one hydrocarbon solvent, the at least one alcohol solvent and the at least one ester solvent; or the at least one hydrocarbon solvent, the at least one alcohol solvent and the at least one ester solvent, and no ketone solvent.

In some embodiments, it is provided that the building waterproofing kit-of-parts, in some cases the masonry waterproofing kit-of-parts, contains A) a first aqueous composition, consisting of or containing
  a0) water,
  a1) at least one ketone solvent, alcohol solvent or ester solvent, in some cases ketone solvent,
  a2) at least one carboxylic acid with 1 to 10 carbon atoms,
  a3) at least one alkylalkoxysilane, and
  a4) at least one aminoalkylalkoxysilane, and
B) a second composition, consisting of or containing
  b1) at least one alkylalkoxysilane,
  b2) at least one hydrocarbon solvent,
  b3) at least one alcohol solvent, ketone solvent and/or ester solvent, in some cases alcohol solvent, and
  b4) at least one ketone solvent, alcohol solvent and/or ester solvent, in some cases ester solvent In some other embodiments, the kit-of-parts according to the present disclosure is characterized by A) a first composition, consisting of or containing
  a0) water,
  a1) at least one ketone solvent, alcohol solvent and/or ester solvent, in some cases ketone solvent,
  a2) at least one carboxylic acid with 1 to 10 carbon atoms,
  a3) at least one alkylalkoxysilane, and
  a4) at least one, in some cases present in protonated form, aminoalkylalkoxysilane, aminoalkylsilane and/or aminoalkoxysilane, in some cases aminoalkylalkoxysilane, and/or, in some cases and,
B) a second composition, consisting of or containing
  b1) at least one alkylalkoxysilane, and
  b2) at least one hydrocarbon solvent,
  b3) at least one alcohol solvent, ketone solvent and/or ester solvent, in some cases alcohol solvent, and
  b4) at least one ketone solvent, alcohol solvent and/or ester solvent, in some cases ester solvent.

Such embodiments of the kit-of-parts according to the present disclosure which are suitable are also those which are characterized by A) A) a first composition, consisting of or containing
  a0) water,
  a1) at least one ketone solvent, in some cases acetone,
  a2) at least one carboxylic acid with 1 to 10 carbon atoms, in some cases formic acid,
  a3) at least one alkylalkoxysilane, in some cases isobutyltrimethoxysilane,
  a4) at least one, in some cases present in protonated form, aminoalkylalkoxysilane, in some cases protonated 3-aminopropyltrimethoxysilane, and/or, in some cases and,
B) a second composition, consisting of or containing
  b1) at least one alkylalkoxysilane, in some cases triethoxymethylsilane, and
  b2) at least one hydrocarbon solvent, in some cases toluene,
  b3) at least one alcohol solvent, in some cases ethanol and/or isopropanol, and
  b4) at least one ester solvent, in some cases ethyl acetate.

In one embodiment, the component a4) in composition A) is present in protonated form due to the simultaneous presence of the carboxylic acid a2), in some cases formic acid. Further, in some embodiments, the component a3) is also present in composition A). Without being bound to a theory, it is currently assumed that, due to the presence of component a4) in protonated form, the component a3), which is usually not water-soluble, is present in solution in the aqueous first composition A). Accordingly, satisfactory results are achieved in some cases with a kit-of-parts according to the present disclosure containing a first composition A), which represents a single-phase system, i.e. an aqueous system, which in any case temporarily does not show any de-mixing.

For the production of composition A), a mixture is in some cases first produced from the at least one carboxylic acid with 1 to 10 carbon atoms a2), in some cases formic acid, and water. Separately, the components a1), a3) and in some cases also a4) are then mixed with each other. In some cases, this mixture is added to the aqueous system containing component a2) while stirring. In one advantageous design, the pH value of this mixture lies in the range of 3.0 to 5.0 or is less than 5.0 or is adjusted to such a value. The composition A) obtained in this manner is in some cases transparent.

Buildings or masonry that can be treated with the kit-of-parts according to the present disclosure comprise, e.g., cellar and ground floor walls and building ceilings, as well as suspended ceilings.

The ketone solvent a1), in some cases also b3) and/or b4), is in some cases selected from the group consisting of acetone, methyl ethyl ketone, methyl isobutyl ketone, cyclohexanone, and their mixtures. In some cases, component a1) is a ketone solvent. This in some cases comprises acetone or is acetone.

The aminoalkylalkoxysilane a4) in some cases comprises at least one aminoalkyldialkoxysilane, one aminoalkyldiethoxysilane or a mixture of these compounds, or consists of these. In some variants of the building waterproofing kit-of-parts according to the present disclosure, in some cases the masonry waterproofing kit-of-parts according to the present disclosure, the aminoalkylalkoxysilane a4) is selected from the group consisting of 3-aminopropyltrimethoxysilane, 3-aminopropyltriethoxysilane, 3-aminopropylmethyldiethoxysilane, N-(2-aminoethyl)-3-aminopropyltrimethoxysilane, 2-aminopropyl-3-aminopropyltriemthoxysilane, 2-aminopropyl-3-aminopropyltriethoxysilane, 2-aminoethyl-2-aminoethyl-3-aminopropyltrimethoxysilane, 2-aminoethyl-2-aminoethyl-3-aminopropyltriethoxysilane, N-(n-butyl)-3-aminopropyltrimethoxysilane and their mixtures. In some cases recourse is made to 3-aminopropyltriethoxysilane, 3-aminopropylmethyldiethoxysilane and/or 3-aminopropyltrimethoxysilane and in some cases to 3-aminopropyltrimethoxysilane.

Together or independently of each other, the alkylalkoxysilane a3) and the alkylalkoxysilane b1) can be a trifunctional silane compound or be formed from a mixture containing at least two trifunctional silane compounds. The alkylalkoxysilanes a3) and/or b1) are here in some cases selected from the group consisting of methyltrimethoxysilane, phenyltrimethoxysilane, methyltriethoxysilane, phenyltriethoxysilane, isobutyltrimethoxysilane, isobutyltriethoxysilane, propyltrimethoxysilane, propyltriethoxysilane, ethyltrimethoxysilane, ethyltriethoxysilane and their mixtures. Alternatively or additionally, recourse can be had to at least one difunctional silane compound for the alkylalkoxysilanes a3) and/or b1). This difunctional silane compound is in some cases selected from the group consisting of dimethyldimethoxysilane, dimethyldiethoxysilane, diethyldiethoxysilane, diphenyldimethoxysilane and their mixtures. In a further suitable design, the alkylalkoxysilane a3) and/or the alkylalkoxysilane b1), in some cases the alkylalkoxysilane b1), can comprise or consist of at least one methyltrialkoxysilane and/or at least one dimethylalkoxysilane, in some cases a methyltrialkoxysilane, e.g. methyltrimethoxysilane and/or methyltriethoxysilane.

In another suitable embodiment, the at least one carboxylic acid with 1 to 10 carbon atoms a2) is selected from the group consisting of formic acid, acetic acid, propionic acid, butyric acid, 2-methyl butyric acid, isovaleric acid, trimethyl acetic acid, glycolic acid, lactic acid and their mixtures. For component a2), recourse is in some cases made to formic acid, acetic acid and/or propionic acid, in some cases to formic acid.

The at least one ester solvent b4), in some cases also a1) and/or b3), can in some cases be selected from the group consisting of methyl acetate, ethyl acetate, n-butyl acetate, amyl acetate and their mixtures. Ethyl acetate as component b4) in some cases has proven to be suitable for the building waterproofing kit-of-parts according to the present disclosure, in some cases the masonry waterproofing kit-of-parts.

The at least one alcohol solvent b3), in some cases also a1) and/or b4), is in some cases selected from the group consisting of methanol, ethanol, isopropanol, n-butanol, isobutanol, sec-butanol, ethylene glycol monomethyl ether, ethylene glycol monoethyl ether, ethylene glycol monoisopropyl ether, ethylene glycol monobutyl ether and their mixtures. Among the alcohol solvents, in some cases according to component b3), ethanol and/or isopropanol have proven themselves to be suitable in some cases. In some other cases a mixture of ethanol and isopropanol is used as component b3).

For the at least one hydrocarbon solvent b2), recourse can be had to liquid aromatic and/or aliphatic hydrocarbons and it is in some cases selected from the group consisting of toluene, xylene, cyclohexane, n-hexane, octane and their mixtures. For component b2), recourse is made in some cases to toluene.

While in some embodiments isobutyltrimethoxysilane, and/or isobutyltriethoxysilane, in some cases isobutyltriethoxysilane, is used for the alkylalkoxysilane a3), in some other embodiments, triethoxymethylsilane is used for the at least one alkylalkoxysilane b1) as an alternative or in some cases simultaneously.

Here, the quantity of isopropanol is in some cases greater than the quantity of ethanol in relation to the volume share used.

The present disclosure also provides such building waterproofing kits-of-parts, in some cases masonry waterproofing kits-of-parts, in which
the first aqueous composition A) contains
    0.5 to 5.0 weight percent, in some cases 0.75 to 4.0 weight percent, and in some other cases 1.0 to 3.0 weight percent, of the at least one ketone solvent, alcohol solvent and/or ester solvent, in some cases ketone solvent, a1), in some other cases acetone,
    0.01 to 1.0 weight percent, in some cases 0.05 to 0.75 weight percent, and in some other cases 0.1 to 0.5 weight percent of the at least one aminoalkylalkoxysilane a4), in some cases 3-aminopropyltrimethoxysilane, 3-aminopropylmethyldiethoxysilane and/or 3-aminopropyltrimethoxysilane, in some other cases 3-aminopropyltrimethoxysilane,
    0.01 to 1.0 weight percent, in some cases 0.05 to 0.75 weight percent and in some other cases 0.1 to 0.5 weight percent of the at least one alkylalkoxysilane a3), in some cases isobutyltrimethoxysilane and/or isobutyltriethoxysilane, in some other cases isobutyltrimethoxysilane,
    0.001 to 0.75 weight percent, in some cases 0.005 to 0.5 weight percent, and in some other cases 0.01 to 0.25 weight percent, of the at least one carboxylic acid a2) with 1 to 10 carbon atoms, in some cases formic acid, acetic acid and/or propionic acid, in some other cases formic acid, and/or
    80.0 to 99.0 weight percent, in some cases 90.0 to 98.5 weight percent, and in some other cases 95.0 to 98.0 weight percent, water a0),
in each case in relation to the total weight of the aqueous composition A), wherein the components forming the first aqueous composition A) always amount to 100 weight percent. The aqueous composition A) in some cases has the components formic acid, 3-aminopropyltrimethoxysilane and isobutyltrimethoxysilane. In some cases, fully desalinated water is used as suitable water.

According to another embodiment, the composition A), alongside the components a0) to a4), contains no tenside additives, in some cases no further additives.

The present disclosure further provides such building waterproofing kits-of-parts according to the present disclosure, in some cases masonry waterproofing kits-of-parts, in which as an alternative or in some cases simultaneously, the second composition B) contains
    30.0 to 80.0 weight percent, in some cases 40.0 to 70 weight percent, and in some other cases 45 to 65 weight percent of the at least one alkylakoxysilane b1), in some cases triethoxymethylsilane and/or trimethoxymethylsilane, in some further cases triethoxymethylsilane.
    1.0 to 15.0 weight percent, in some cases 1.5 to 10.0 weight percent, and in some other cases 2.0 to 7.0 weight percent, of the at least one ketone solvent, alcohol solvent and/or ester solvent, in some cases ester solvent, b4), in some other cases ethyl acetate,
    20.0 to 70.0 weight percent, in some cases 25.0 to 60.0 weight percent, and in some other cases 30.0 to 50.0 weight percent, of the at least one alcohol solvent, ketone solvent and/or ester solvent, in some cases alcohol solvent, b3), in some other cases ethanol and/or isopropanol, in some further cases ethanol and isopropanol, and/or
    0.01 to 1.0 weight percent, in some cases 0.05 to 0.75 weight percent and in some other cases 0.1 to 0.5 weight percent of the at least one hydrocarbon solvent b2), in some cases toluene,
in each case in relation to the total weight of the composition B), wherein the components forming the composition B) always amount to 100 weigh percent.

The compositions A) and B) and the mixture obtained from A) and B) are in some cases characterized by a watery or essentially water-like viscosity (determined at 22° C.). Component B) is in some cases essentially water-free.

Among the kit-of-parts according to the invention those are particularly suitable in which the second composition B), in each case in relation to the total weight of the composition B), contain 20.0 70.0 weight percent, preferably 25.0 to 60.0 weight percent, and particularly preferred 30.0 to 50.0 weight percent isopropanol, and 0.1 to 10 weight percent, preferably 0.2 to 5.0 weight percent, and particularly preferably 0.5 to 3.0 weight percent ethanol.

With the kits-of-parts according to the present disclosure, the first aqueous composition A) and/or the second composition B) in some cases are single-phase systems.

The volume ratio between compositions A) and B) is in some cases in the range of 2:1 to 50:1, in some cases in the range of 5:1 to 40:1, and in some other cases in the range of 8:1 to 20:1.

Further, the present disclosure is also attained by way of those building waterproofing kits-of-parts, in some cases masonry waterproofing kits-of-parts, in which composition A) is obtainable by
  i) producing a mixture of the at least one carboxylic a2) with 1 to 10 carbon atoms, in some cases propionic acid, acetic acid and/or in some cases formic acid, in some further cases and water a0),
  ii) producing a mixture of the at least one ketone solvent, alcohol solvent and/or ester solvent, in some cases ketone solvent a1), in some cases acetone, the at least one aminoalkylalkoxysilane a4),
  in some cases 3-aminopropyltriethoxysilane, 3-aminopropylmethyldiethoxysilane and/or aminopropyltrimethoxysilane and in some cases 3-aminopropyltrimethoxysilane, and the at least one alkylalkoxysilane a3), in some cases isobutyltrimethoxysilane and/or isobutyltriethoxysilane, in some other cases isobutyltrimethoxysilane,
  iii) mixing the compositions obtained according to step i) and step ii).

Here, the mixing according to step iii) can comprise the addition of the composition obtained according to step ii) to the composition obtained according to step i). The mixing is here in some cases conducted by way of stirring, wherein in an advantageous design, the mixing is conducted such that oily deposits do not occur on the surface.

Furthermore, the composition A) can, in one embodiment according to the present disclosure, have a pH value in the range of 3.0 to 5.0 or of less than 5.0, in some cases in the range of 3.5 to 4.9, and in other some cases in the range of 3.7 to 4.8, or can be adjusted to a pH value in the range of 3.0 to 5.0 or of less than 5.0, in some cases in the range of 3.5 to 4.9, or in the range of 3.7 to 4.8.

The kit-of-parts according to the present disclosure is suitable in some cafor waterproofing a building, in some cases masonry, in some further cases damp masonry, for the removal of moisture damage in buildings, in some cases masonry, for the moisture sealing of buildings, in some cases masonry, and/or for the formation of an, in some cases essentially horizontal, moisture barrier in buildings, in some cases in masonry.

The present disclosure is also attained by way of an aqueous building waterproofing agent, in some cases an aqueous masonry waterproofing agent, obtained or obtainable by mixing composition A) and composition B) of the kit-of-parts according to the present disclosure.

This building or masonry waterproofing agent in some cases has a pH in the range of 3.0 to 5.0 or of less than 5.0, in some cases in the range of 3.5 to 4.9, and in some other cases in the range of 3.7 to 4.8, or is adjusted to a pH in the range of 3.0 to 5.0 or of less than 5.0, in some cases in the range of 3.5 to 4.9.

The building or masonry waterproofing agent according to the present disclosure is in some cases essentially directly injected after production from components A) and B) of the kit-of-parts according to the present disclosure via bore holes and is injected into the damp masonry with the aid of cannulas inserted into said bore holes. The building or masonry waterproofing agent according to the present disclosure is characterized by a surprisingly long shelf life, for example over a period of up to one day, in some cases of up to 12 hours. For many applications, it is recommended that the agent according to the present disclosure be used prior to expiry of a storage period of eight hours following mixing of components A) and B). The injection techniques described are known to a person skilled in the art. The bore holes should expediently not be drilled through the entire building or masonry, but instead not penetrate a wall fully, for example. These bore holes are designed such that cannulas or so-called diffusors can be easily inserted. By connecting these cannulas or diffusors with liquid containers arranged at a relatively high position by way of hoses or pipes, the liquid building or masonry waterproofing agent according to the present disclosure can seep into a building or masonry. The number and arrangement of the bore holes depend on the conditions of the respective building or the respective masonry. Frequently, it is often sufficient when the individual bore holes are set at a distance of approximately 10 to 20 cm in an essentially horizontal row. Due to the capillary effect, at first, an even distribution of the aqueous system occurs. Although considerably quantities of water are additionally applied to the masonry with the use of the kit-of-parts according to the present disclosure, the formation of a moisture-free area, which also serves as a horizontal humidity barrier, is achieved. Naturally, vertical or diagonal or large-volume moisture barriers can be formed via the bore holes, depending on the nature of the application.

The present disclosure is further attained by way of an aqueous composition containing
  3.0 to 8.0 weight percent, in some cases 4.0 to 7.0 weight percent, and in some other cases 5.0 to 6.0 weight percent, of the at least one ketone solvent, alcohol solvent and/or ester solvent, in some cases ketone solvent, a1), in some other cases acetone,
  0.1 to 1.2 weight percent, in some cases 0.3 to 1.0 weight percent, and in some other cases 0.5 to 0.8 weight percent of the at least one aminoalkylalkoxysilane a4), 3-aminopropyltriethoxysilane, 3-aminopropylmethyldiethoxysilane and/or 3-aminopropyltrimethoxysilane, in some cases 3-aminopropyltrimethoxysilane,
  0.1 to 1.2 weight percent, in some cases 0.3 to 1.0 weight percent and in some other cases 0.5 to 0.8 weight percent of the at least one alkylalkoxysilane a3), in some cases isobutyltrimethoxysilane and/or isobutyltriethoxysilane, in some other cases isobutyltrimethoxysilane,
  0.01 to 0.75 weight percent, in some cases 0.05 to 0.5 weight percent, and in some other cases 0.1 to 0.25 weight percent, of the at least one carboxylic acid a2) with 1 to 10 carbon atoms, in some cases formic acid, acetic acid and/or propionic acid, in some other cases formic acid, and/or
  88.85 to 96.79 weight percent, in some cases 90.5 to 95.35 weight percent, and in some other cases 92.15 to 93.9 weight percent, water,
  in each case in relation to the total weight of the aqueous composition, wherein the components forming the aqueous composition always amount to 100 weight percent.

This aqueous composition according to the present disclosure can in some cases also be used as a concentrate for the production of composition A) of the kit-of-parts according to the present disclosure. This makes transportation and handling considerably easier.

The features of the present disclosure disclosed in the foregoing description and in the claims can be essential for the implementation of the present disclosure in its different embodiments, both individually as well as in any combination.

The various embodiments described above can be combined to provide further embodiments. All of the patents, patent applications, and non-patent publications referred to in this specification and/or listed in the Application Data Sheet are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A building waterproofing kit-of-parts, comprising a first composition and a second composition,
    A) the first composition, containing
        a0) water,
        a1) at least one ketone solvent, at least one alcohol solvent or at least one ester solvent,
        a2) at least one carboxylic acid with 1 to 10 carbon atoms, and at least one component selected from the group consisting of
        a3) at least one alkylalkoxysilane,
        a4) at least one aminoalkylalkoxysilane, aminoalkylsilane and aminoalkoxysilane, and
    B) the second composition, containing
        b1) at least one alkylalkoxysilane, and at least one component selected from the group consisting of
        b2) at least one hydrocarbon solvent,
        b3) at least one alcohol solvent, ketone solvent and ester solvent.

2. The building waterproofing kit-of-parts according to claim 1, wherein
    the at least one ketone solvent a1) is selected from the group consisting of acetone, methyl ethyl ketone, methyl isobutyl ketone, cyclohexanone and their mixtures,
    and/or wherein
    the at least one aminoalkylalkoxysilane a4) comprises at least one aminoalkyldialkoxysilane and/or one aminoalkyldiethoxysilane and/or is selected from the group consisting of 3-aminopropyltrimethoxysilane, 3-aminopropyltriethoxysilane, 3-aminopropylmethyldiethoxysilane, N-(2-aminoethyl)-3-aminopropyltrimethoxysilane, 2-aminopropyl-3-aminopropyltriemthoxysilane, 2-aminopropyl-3-aminopropyltriethoxysilane, 2-aminoethyl-2-aminoethyl-3-aminopropyltrimethoxysilane, 2-aminoethyl-2-aminoethyl-3-aminopropyltriethoxysilane, N-(n-butyl)-3-aminopropyltrimethoxysilane and their mixtures,
    and/or wherein
    the at least one alkylalkoxysilane a3) and/or the at least one alkylalkoxysilane b1) comprises at least one trifunctional silane compound, mixtures and/or at least one difunctional silane compound,
    and/or wherein
    the at least one carboxylic acid with 1 to 10 carbon atoms a2) is selected from the group consisting of formic acid, acetic acid, propionic acid, butyric acid, 2-methyl butyric acid, isovaleric acid, trimethyl acetic acid, glycolic acid, lactic acid and their mixtures,
    and/or wherein
    the at least one ester solvent b3) is selected from the group consisting of methyl acetate, ethyl acetate, n-butyl acetate, amyl acetate and their mixtures,
    and/or wherein
    the at least one alcohol solvent b3) is selected from the group consisting of methanol, ethanol, isopropanol, n-butanol, isobutanol, sec-butanol, ethylene glycol monomethyl ether, ethylene glycol monoethyl ether, ethylene glycol monoisopropyl ether, ethylene glycol monobutyl ether and their mixtures,
    and/or wherein
    the at least one hydrocarbon solvent b2) is selected from the group consisting of toluene, xylene, cyclohexane, n-hexane, octane and their mixtures.

3. The building waterproofing kit-of-parts according to claim 2, wherein
    the at least one ketone solvent a1) represents or comprises acetone, and/or wherein
    the at least one aminoalkylalkoxysilane of a4) represents or comprises 3-aminopropyltrimethoxysilane, and/or wherein
    the at least one alkylalkoxysilane a3) and/or the at least one alkylalkoxysilane b1) is selected from the group consisting of methyltrimethoxysilane, phenyltrimethoxysilane, methyltriethoxysilane, phenyltriethoxysilane, isobutyltrimethoxysilane, isobutyltriethoxysilane, propyltrimethoxysilane, propyltriethoxysilane, ethyltrimethoxysilane, ethyltriethoxysilane and their mixtures, and/or
    wherein the at least one difunctional silane compound is selected from the group consisting of dimethyldimethoxysilane, dimethyldiethoxysilane, diethyldiethoxysilane, diphenyldimethoxysilane and their mixtures, and/or wherein
    the at least one carboxylic acid with 1 to 10 carbon atoms a2) represents or comprises formic acid, and/or wherein
    the at least one ester solvent of b3) comprises or represents ethyl acetate, and/or wherein
    the at least one alcohol solvent of b3) represents or comprises ethanol and/or isopropanol, and/or wherein
    the at least one hydrocarbon solvent b2) comprises or represents toluene.

4. The building waterproofing kit-of-parts according to claim 1, wherein
    the at least one alkylalkoxysilane a3) comprises or represents isobutyltrimethoxysilane,
    and/or wherein
    the at least one alkylalkoxysilane b1) comprises or represents triethoxymethylsilane.

5. The building waterproofing kit-of-parts according to claim 1, wherein
    the at least one alcohol solvent of b3) represents ethanol and isopropanol.

6. The building waterproofing kit-of-parts according to claim 5, wherein a quantity of isopropanol is greater than a quantity of ethanol in relation to a volume fraction used.

7. The building waterproofing kit-of-parts according to claim 1, wherein
the first composition A) contains
0.5 to 5.0 weight percent, of the at least one ketone solvent of a1), 0.01 to 1.0 weight percent of the at least one aminoalkylalkoxysilane of a4), 0.01 to 1.0 weight percent of the at least one alkylalkoxysilane a3), 0.001 to 0.75 weight percent of the at least one carboxylic acid a2) with 1 to 10 carbon atoms and/or 80.0 to 99.0 weight percent of water a0),
in each case in relation to the total weight of the composition A), wherein components forming the first composition A) always amount to 100 weight percent,
and/or wherein
the second composition B) contains
30.0 to 80.0 weight percent of the at least one alkylakoxysilane b1),
1.0 to 15.0 weight percent of the at least one ester solvent of b3),
20.0 to 70.0 weight percent of the at least one alcohol solvent of b3),
0.01 to 1.0 weight percent of the at least one hydrocarbon solvent b2),
in each case in relation to the total weight of the second composition B), wherein components forming first second composition B) always amount to 100 weight percent.

8. The building waterproofing kit-of-parts according to claim 7, wherein
the first composition A) contains
1.0 to 3.0 weight percent of the at least one ketone solvent a1),
0.1 to 0.5 weight percent of the at least one aminoalkylalkoxysilane of a4),
0.1 to 0.5 weight percent of the at least one alkylalkoxysilane a3),
0.01 to 0.25 weight percent of the at least one carboxylic acid a2) with 1 to 10 carbon atoms, and/or 95.0 to 98.0 weight percent of water a0),
in each case in relation to the total weight of the aqueous composition A), wherein the components forming the first composition A) always amount to 100 weight percent.

9. The building waterproofing kit-of-parts according to claim 7, wherein the second composition B) contains
45 to 65 weight percent of the at least one alkylakoxysilane b1),
2.0 to 7.0 weight percent of the at least one ester solvent of b3,
30.0 to 50.0 weight percent of the at least one alcohol solvent of b3), and/or
0.1 to 0.5 weight percent of the at least one hydrocarbon solvent b2),
in each case in relation to the total weight of the second composition B), wherein the components forming the second composition B) always amount to 100 weight percent.

10. The building waterproofing kit-of-parts according to claim 1, wherein
the second composition B) contains 20.0 to 70.0 weight percent isopropanol, and 0.1 to 10.0 weight percent ethanol in each case in relation to the total weight of the composition B).

11. The building waterproofing kit-of-parts according to claim 1, wherein
the first composition A) and/or the second composition B) represent a single-phase system.

12. The building waterproofing kit-of-parts according to claim 1, wherein a volume ratio between compositions A) and B) is in a range of 2:1 to 50:1.

13. The building waterproofing kit-of-parts according to claim 1, characterized by
A) the first composition, containing
a0) water,
a1) the at least one ketone solvent,
a2) the at least one carboxylic acid with 1 to 10 carbon atoms,
a3) the at least one alkylalkoxysilane,
a4) the at least one aminoalkylalkoxysilane, the at least one aminoalkylsilane and/or the at least one aminoalkoxysilane, and
B) the second composition, containing
b1) the at least one alkylalkoxysilane, and
b2) the at least one hydrocarbon solvent,
b3) the at least one alcohol solvent and the at least one ester solvent solvent.

14. The building waterproofing kit-of-parts according to claim 13, wherein component a4) is aminoalkylalkoxysilane.

15. The building waterproofing kit-of-parts according to claim 1, wherein
the composition A) is obtainable through
i) producing a mixture of the at least one carboxylic acid of a2) with 1 to 10 carbon atoms and water,
ii) producing a mixture of the at least one ketone solvent, the at least one alcohol and/or the at least one solvent, the at least one aminoalkylalkoxysilane of a4) and the at least one alkylalkoxysilane of a3),
iii) mixing compositions obtained according to step i) and step ii).

16. The building waterproofing kit-of-parts according to claim 15, wherein the mixing according to step iii) comprises addition of a composition obtained according to step ii) to a composition obtained according to step i).

17. The building waterproofing kit-of-parts according to claim 1, wherein the composition A) has a pH value in a range of 3.0 to 5.0 or of less than 5.0, or is adjusted to a pH value in a range of 3.0 to 5.0 or of less than 5.0.

18. The building waterproofing kit-of-parts according to claim 1, wherein the building waterproofing kit-of-parts is a masonry waterproofing kit-of-parts.

19. The building waterproofing kit-of-parts according to claim 1, wherein
the component a1) is a ketone solvent, and
the component a4) is aminoalkylalkoxysilane.

20. The building waterproofing kit-of-parts according to claim 1, wherein
the component b3) is an alcohol solvent and an ester solvent.

* * * * *

UNITED STATES PATENT AND TRADEMARK OFFICE
CERTIFICATE OF CORRECTION

| | | |
|---|---|---|
| PATENT NO. | : 12,151,984 B2 | Page 1 of 1 |
| APPLICATION NO. | : 17/055452 | |
| DATED | : November 26, 2024 | |
| INVENTOR(S) | : Gaspard Stefan and Gabor Peter | |

It is certified that error appears in the above-identified patent and that said Letters Patent is hereby corrected as shown below:

In the Claims

In Column 11, Claim 7, Line 26, delete "first" and insert --the--.

In Column 12, Claim 13, Line 27, delete "solvent solvent" and insert --solvent--.

Signed and Sealed this
Fourth Day of February, 2025

Coke Morgan Stewart
*Acting Director of the United States Patent and Trademark Office*